(12) United States Patent
Carlson

(10) Patent No.: US 6,525,859 B2
(45) Date of Patent: Feb. 25, 2003

(54) OPTICAL SHUTTER

(75) Inventor: Steven A. Carlson, Cambridge, MA (US)

(73) Assignee: Optodot Corporation, Boston, MA (US)

( * ) Notice: Subject to any disclaimer, the term of this patent is extended or adjusted under 35 U.S.C. 154(b) by 134 days.

(21) Appl. No.: 09/837,770

(22) Filed: Apr. 18, 2001

(65) Prior Publication Data

US 2001/0038732 A1 Nov. 8, 2001

Related U.S. Application Data

(60) Provisional application No. 60/197,726, filed on Apr. 18, 2000.

(51) Int. Cl.⁷ .................................................. G02F 1/07
(52) U.S. Cl. ........................ 359/241; 359/244; 359/240; 359/321
(58) Field of Search ............................... 359/241, 244, 359/240, 321; 252/582, 587, 583

(56) References Cited

U.S. PATENT DOCUMENTS

| | | | |
|---|---|---|---|
| 5,508,145 A | 4/1996 | Robillard | |
| 5,525,430 A * | 6/1996 | Chahroudi | 428/620 |
| 6,005,058 A | 12/1999 | Sandman et al. | |
| 6,165,389 A * | 12/2000 | Asher et al. | 252/582 |
| 6,172,795 B1 * | 1/2001 | Carlson | 359/290 |
| 6,194,529 B1 | 2/2001 | Hollingsworth et al. | |
| 6,214,435 B1 | 4/2001 | Onishi et al. | |
| 6,381,059 B1 * | 4/2002 | Carlson | 359/244 |

* cited by examiner

*Primary Examiner*—Hung Xuan Dang
*Assistant Examiner*—Tuyen Tra
(74) *Attorney, Agent, or Firm*—Richard L. Sampson

(57) ABSTRACT

The present invention pertains to an optical shutter comprising an organic free compound, such as a radical cation or a radical anion, and a polydiacetylene compound, wherein the polydiacetylene compound is characterized by having a change in absorption in a wavelength region as a result of a photo-induced heat transfer from the free radical compound. The thermochromic change in absorption is reversed by thermal cooling or by a photo-induced reaction after the photo-induced heat transfer. Also provided is an optical shutter for use as an optical switch in fiber optic communications, and, alternatively, for use in a laser protection device, in a security protection system, or in an eyewear device.

42 Claims, No Drawings

OPTICAL SHUTTER

RELATED APPLICATION

This application claims priority to U.S. Provisional Patent Application No. 60/197,726, filed Apr. 18, 2000, the contents of which are fully incorporated herein by reference for all purposes.

FIELD OF THE INVENTION

The present invention relates to the field of optical shutters and, particularly, pertains to optical shutters which operate in the near-infrared and/or visible wavelength regions. More specifically, this invention pertains to optical shutters comprising one or more photon absorbing materials, such as an organic free radical compound that converts absorbed photons to heat in less than 1 nanosecond, and one or more reversible thermochromic polydiacetylene materials.

BACKGROUND OF THE INVENTION

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

As the quantity and speed of data communications over fiber optics systems rapidly increases due to the growing demand from Internet usage and other communications, all-optical switching systems are of increased interest to overcome the high cost and slow switching speeds of conventional switches. These conventional switches include, for example, various mechanical switches, electro-optic switches, and thermo-optic switches, such as, for example, described in U.S. Pat. Nos. 5,732,168 and 5,828,799, both to Donald. In particular, the increased complexity and cost of switching systems which involve switching from an optical signal to an electrical signal and then back to an optical signal have increased the level of interest in all-optical switches.

An all-optical switch typically switches an optical signal from one output port to another. This is typically accomplished by applying an input pump signal from a pump laser source to cause the optical signal to be selectively switched. The switch is responsive to the laser pump signal to selectively switch the light of the optical signal to one or the other of the output ports.

A variety of approaches are known for making all-optical or hybrid optical switches, such as, for example, described in U.S. Pat. No. 5,905,587 to Maeno et al.; U.S. Pat. No. 5,923,798 to Aksyuk et al.; U.S. Pat. No. 5,970,185 to Baker et al.; U.S. Pat. No. 5,841,912 to Mueller-Fiedler et al.; U.S. Pat. No. 5,757,525 to Rao et al.; U.S. Pat. No. 5,872,648 to Sanchez et al.; U.S. Pat. No. 5,091,984 to Kobayashi et al.; U.S. Pat. No. 5,406,407 to Wolff; U.S. Pat. No. 5,740,287 to Scalora et al.; U.S. Pat. No. 5,960,133 to Tomlinson; and U.S. Pat. No. 5,539,100 to Waslielewski et al. For example, as described in U.S. Pat. No. 5,943,453 to Hodgson; one basic configuration for an all-optical switch is a Mach-Zehnder interferometer which includes a first fiber optic input arm for receiving an input optical signal and a second fiber optic input arm for receiving a switching pump signal. The input arms are fused together to form a first coupler which subsequently branches out into two intermediate arms. The first coupler splits the input light signal into equal portions which then enter the two intermediate arms. The two intermediate arms are once again fused to form a second coupler which branches into two output arms. After traveling through the two intermediate arms, the two signals are recombined by the second coupler. If the two signals are in phase at the second coupler, then all the light is coupled into a first one of the two output ports. If the two signals are completely out of phase, then the light is coupled into the other of the two output ports. The reliability of the Mach-Zehnder interferometer for optical switching is typically sensitive to temperature-dependent effects.

The need for improved optical switches is increased by the use of wavelength add/drop multiplexing (WADM) which converts the optical signal in the optical fiber into, for example, 16 signals at 16 different wavelengths in a near-infrared range of about 1540 to 1560 nm, as, for example, described in *Bell Labs Technical Journal*, January–March 1999, pages 207 to 229, and references therein, by Giles et al.; and in U.S. Pat. No. 5,959,749 to Danagher et al. There is about 1 nm between the wavelength channels. The primary function of the optical switch is to add and/or drop optical signals from the multiple wavelengths traveling through the optical fiber. It would be highly desirable to have arrays of optical switches to handle the optical signals from multiple wavelengths per optical fiber and multiple optical fibers, such as up to 100×100 or greater optical switch arrays. Also, it would be highly desirable if the response time for the optical switch is ultrafast, such as 1 nanosecond or less.

It would be advantageous if an all-optical switching system were available which avoided the complexity and cost of hybrid electro-optic and other systems while increasing the speed of the switching times from the millisecond range to the nanosecond or picosecond ranges.

SUMMARY OF THE INVENTION

One aspect of the present invention pertains to an optical shutter comprising (1) an organic free radical compound in which the free radical compound is photon-absorbing and (2) a polydiacetylene compound, wherein the polydiacetylene compound is characterized by having a change in absorption in a wavelength region as a result of a photo-induced heat transfer from the free radical compound. In one embodiment, the free radical compound is a radical cation, preferably an aminium radical cation. In one embodiment, the free radical compound is a radical anion, preferably an anthrasemiquinone radical anion.

In one embodiment of the optical shutter of this invention, the change in absorption is reversed by cooling to a temperature of less than 50° C. In one embodiment, the change in absorption is reversed by cooling to a temperature of less than 75° C. In one embodiment, the change in absorption is reversed by cooling to a temperature of less than 110° C.

In one embodiment of the optical shutter of this invention, the change in absorption as a result of the photo-induced heat transfer is reversed by a photo-induced reaction. In one embodiment, the optical shutter comprises a photosensitizer compound and the photo-induced reaction is sensitized by the photosensitizer compound. In one embodiment, the photo-induced reaction is a photo-induced reversible electron transfer reaction.

In one embodiment of the optical shutter of the present invention, the optical shutter is utilized in an optical switch for a fiber optics communications channel. In one embodiment, the optical shutter is utilized in a viewing lens of an eyewear device. In one embodiment, the optical shutter is utilized in a laser protection device for protection of eyes or sensors from a source of laser radiation. In one embodiment, the optical shutter is utilized in a security protection system based on detecting the change in absorption upon exposure of the optical shutter in the security protection system to high intensity radiation selected from the group consisting of ultraviolet radiation, visible radiation, and infrared radiation.

As will be appreciated by one of skill in the art, features of one aspect or embodiment of the invention are also applicable to other aspects or embodiments of the invention.

DETAILED DESCRIPTION OF THE INVENTION

The optical shutters of the present invention provide superior speed of response, such as a response time of 1000 picoseconds or less, to the incident radiation, and are particularly useful in systems where an all-optical shutter or switch mechanism is desirable.

An organic free radical compound where the excited state is an excited state corresponding to a free radical ground state to an excited state absorption transition may have a rapid internal conversion from this excited state back to the ground state with a concomitant production of heat in a time scale of as low as 1 picosecond or less. In one example of this, a photon absorbing material absorbs photons in the presence of a thermochromic compound, converts the absorbed photons to heat in less than 1 nanosecond, and causes a change in absorption due to heat-induced changes in the thermochromic compound, as described in PCT International Publication No. WO 98/54615, titled "Optical Shutter Device" and published Dec. 3, 1998, by Carlson. The present invention utilizes a polydiacetylene compound which undergoes a heat-induced reversible thermochromic transformation which causes changes in absorption. This heat-induced reaction may occur faster than internal conversion of the absorbed photons to heat or, alternatively, may have a similar or lower speed than this internal photon-to-heat conversion to heat by the organic free radical compound.

Organic Free Radical Compounds

The term "organic free radical compounds," as used herein, pertains to organic compounds which comprise at least one free unpaired electron on an atom, such as, for example, a carbon atom, a nitrogen atom, or an oxygen atom, in the ground state of the organic compound. Suitable organic free radical compounds for the optical shutters of the present invention include neutral organic free radicals, organic free radical cations, and organic free radical anions. For purposes of brevity, the terms "organic free radical cation", "organic radical cation", and "radical cation" are used interchangeably herein. The word "cation," as used herein, pertains to a positively charged atom in a molecule, such as, for example, a positively charged nitrogen atom. Similarly, the terms "organic free radical anion", "organic radical anion", and "radical anion" are used interchangeably herein. The word "anion," as used herein, pertains to a negatively charged atom in a molecule, such as, for example, a negatively charged oxygen atom. It should be noted that the free unpaired electron and the positive and negative charges of the organic free radical compounds may be localized on a single atom or shared among more than one atom.

Examples of suitable organic free radical cations for the optical shutters of this invention include, but are not limited to, aminium radical cations, such as, for example, tris(p-dibutylaminophenyl)aminium hexafluoroantimonate, which is commercially available as IR-99, a trademark for a dye available from Glendale Protective Technologies, Inc., Lakeland, Fla. IR-99 is known to be a stable radical cation that may exist in a layer of material, such as in a polymeric coating, under normal room conditions for an extended period of time. Another example of a useful aminium radical cation is IR-126, a trademark for a dye available from Glendale Protective Technologies, Inc., Lakeland, Fla. Another useful radical cation is IR-165, a trademark for a dye available from Glendale Protective Technologies, Inc., Lakeland, Fla. IR-165 is a stable diradical dication which may be formed by a one-electron oxidation of IR-126. A wide variety of anions may be utilized with the radical cations as, for example, the anions described in U.S. Pat. No. 6,214,435 B1 to Onishi et al. and references therein.

Examples of suitable organic free radical anions for the optical shutters of the present invention include, but are not limited to, anthrasemiquinone radical anions, such as, for example, described in *Photochemistry and Photobiology*, Vol. 17, pages 123–131 (1973), by Carlson et al.

Due to the presence of the free radical moiety, organic free radical compounds typically have unique longer wavelength absorptions when compared to the corresponding non-free radical compounds. For example, the absorption spectra of IR-165, a radical cation, and its extremely rapid internal conversion of absorbed photons to heat are described in various publications, such as in PCT International Publication No. WO 98/54615, and references therein, to Carlson. Also, for example, the absorption spectra of 9,10-anthrasemiquinone radical anion and its photochemistry are described in the above-referenced publication by Carlson et al. and in *The Photochemistry of Anthraquinone and Related Compounds*, Ph.D. Thesis, Massachusetts Institute of Technology, 1969, by Carlson.

An organic free radical compound where the excited state corresponds to a lowest excited state formed directly from absorption from the free radical ground state may have a rapid conversion from this excited state back to the ground state with an accompanying production of heat by this photothermal process in a time scale of as low as 1 picosecond or less, as, for example, observed with coatings of IR-165 upon high intensity laser irradiation at 1065 nm, as described, for example, in PCT International Publication No. WO 98/54615, and references therein, to Carlson. The present invention is directed at utilizing organic free radical compounds and, alternatively, non-free radical compounds, that undergo a very rapid photo-induced heat transfer together with a reversible thermochromic material, such as a thermochromic polydiacetylene compound, for use in an optical shutter where the desired change in absorption upon optical excitation is a result of a reversible thermochromic transformation.

A example, a light yellow-green layer comprising IR-165 upon laser exposure at 1065 nm undergoes photo-induced heat transfer which efficiently heats the layer to elevated temperatures as high as, for example, 500° C. The presence of a reversible thermochromic polydiacetylene compound in the layer produces a product having a reversible change in absorption in the visible and/or the near-infrared wavelength regions.

Also, for example, layers comprising anthrasemiquinone radical anions, including the many possible substituted and other derivatives of the anthrasemiquinone radical anion, may undergo photo-induced heat transfer which occurs very rapidly and efficiently heats the layer to elevated temperatures. The presence of a reversible thermochromic polydiacetylene compound in the layer produces a product having a reversible change in absorption in the visible and/or the near-infrared wavelength regions.

Polydiacetylene Compounds

The term "polydiacetylene compounds", as used herein, pertains to polymeric compounds which comprise at least one conjugated diacetylenic moiety of two triple-bonded acetylenic moieties joined together through a carbon-carbon single bond. Suitable polydiacetylene compounds for the optical shutters of the present invention are thermochromic with a reversible thermochromic process upon heating and subsequent cooling, as known in the art for polydiacetylene compounds, or alternatively a thermochromic process upon heating that may be reversed by a photo-induced reaction, such as by a photo-induced reversible electron transfer reaction. Many polydiacetylenes show thermochromic properties, but the thermochromic transition is often irreversible and the color formed upon heating is permanent. For example, a typical color for a polydiacetylene compound is blue. Upon heating, this blue color typically undergoes a thermochromic change to red. For example, for a reversible thermochromic polydiacetylene compound that changes from blue to red upon heating, such as with heating to a temperature of 70° C., subsequent cooling to below 70° C., such as to around 25° C., changes the color back to blue. This reversible thermochromic behavior may be repeated through many heating-cooling cycles.

By proper choice of molecular structure of the polydiacetylene compound, the absorption spectrum of the non-heated and heated reversible thermochromic forms may be matched to the wavelength regions such as, a near-infrared wavelength, where an absorption change is desired. Examples of reversible thermochromic polydiacetylene compounds known in the art, along with their absorption properties and molecular structure and methods of synthesizing polydiacetylenes and of incorporating polydiacetylenes into a layer, are described, for example, in U.S. Pat. No. 5,731,112, and references therein, to Lewis et al.; U.S. Pat. No. 5,508,145 to Robillard; U.S. Pat. No. 6,005,058 to Sandman et al.; and U.S. Pat. No. 6,194,529 B1 to Hollingsworth et al.; and in Langmuir, Vol. 15, pages 3972–3980 (1999), and references therein, by Huo et al. For example, certain types of metal salts, such as zinc salts, of polydiacetylene compounds are described as reversible, thermochromic materials in U.S. Pat. No. 5,731,112, to Lewis et al.

Optical Shutters

One aspect of the present invention pertains to an optical shutter comprising (1) an organic free radical compound in which the free radical compound is photon-absorbing and is characterized by converting absorbed photons to heat, preferably in less than 1 nanosecond, and (2) a reversible thermochromic polydiacetylene compound having a change in absorption in a visible and/or a near-infrared wavelength region as a result of a heat-induced transformation by a photo-induced heat transfer from the free radical compound. The terms "near-infrared wavelength region" and "near-infrared", as used herein, pertain to wavelengths from 700 nm to 2000 nm. The terms "visible wavelength region" and "visible", as used herein, pertain to wavelengths from 400 to 700 nm. The terms "ultraviolet wavelength region" and "ultraviolet" as used herein, pertain to wavelengths from 200 to 400 nm. In one embodiment, the free radical compound is a radical cation, preferably an aminium radical cation, and most preferably, the radical cation is tris(p-dibutylaminophenyl)aminium hexafluoroantimonate (TAH). In one embodiment, the free radical compound is a radical anion, preferably an anthrasemiquinone (ASQ) radical anion.

In one embodiment of the optical shutter of the present invention, the change in absorption is greater than 0.1, preferably greater than 0.5, more preferably greater than 1.5, and most preferably greater than 3.0. These absorption changes are measured in optical density units, as known in the art, where an optical density of 1.0 corresponds to 90% absorption and 10% transmission of the incident wavelength or wavelengths of radiation. Thus, for example, an initial absorption or optical density of the optical shutter of 0.1 at 1546 nm that changes to an absorption or optical density in the optical shutter of 1.6 at 1546 nm would have a change in absorption of 1.6 minus 0.1 or 1.5. In one embodiment, the near-infrared wavelength region of the change in absorption is from 700 to 1000 nm. In one embodiment, the near-infrared wavelength region of the change in absorption is from 1000 to 1700 nm, preferably from 1250 to 1600 nm, and more preferably from 1520 to 1580 nm.

In one embodiment of the optical shutter of this invention, the photo-induced heat formation occurs in less than 1 nanosecond after absorption of photons by the free radical compound, preferably occurs in less than 0.1 nanoseconds, more preferably occurs in less than 0.01 nanoseconds, and most preferably occurs in less than 0.001 nanoseconds.

In the optical shutter of this invention, the photo-induced thermochromic change in absorption is reversible. In one embodiment, the change in absorption is reversed by cooling to a temperature of less than 50° C. In one embodiment, the change in absorption is reversed by cooling to a temperature of less than 75° C. In one embodiment, the change in absorption is reversed by cooling to a temperature of less than 110° C. In one embodiment, the change in absorption is reversed in less than 1 second after the photo-induced heat transfer, preferably is reversed in less than 10 milliseconds, more preferably is reversed in less than 1 millisecond, and most preferably is reversed in less than 0.1 milliseconds. In one embodiment, the reversible change in absorption occurs at less than 50° C. In one embodiment, the reversible change in absorption occurs at less than 75° C. In one embodiment, the reversible change in absorption occurs at less than 110° C. In one embodiment, the reversible change in absorption occurs in less than 1 second after the photon absorption that produced the thermochromic transformation, preferably occurs in less than 10 milliseconds, more preferably occurs in less than 1 millisecond, and most preferably occurs in less than 0.1 milliseconds.

In addition to a thermal or dark reverse reaction to provide a reversible change in absorption, the product of the photo-induced thermochromic change in the polydiacetylene may be thermally stable, or may be still present in the photo-induced thermochromic form prior to a dark or thermal reverse reaction, and the reverse reaction may be induced by the absorption of photons. This is particularly advantageous in optical switch and related ultrafast optical applications when a 1 nanosecond or faster switching time for the forward and the reverse or back reactions is desired. Thermal cooling as the process for the reverse reaction typically occurs in a microsecond or longer. In contrast, a photo-induced reverse reaction may be initiated and completed in less than 1 nanosecond after the photon absorption for the forward reaction and thus may occur while the heat-induced thermochromic form of the polydiacetylene is still present and has not significantly reverted thermally to the starting polydiactetylene.

To provide the photo-induced reverse reaction, the absorption of photons may be by the organic free radical compound, by the heat-induced thermochromic form of the polydiactetylene, by a photosensitizer compound added to the layer for the purpose of sensitizing this back reaction, or by combinations thereof. In one embodiment, the optical shutter further comprises a photosensitizer compound and the photo-induced reaction is sensitized by the photosensitizer compound. Preferably, the photo-induced reverse reaction is a sub-nanosecond photo-induced electron transfer with a rapid, sub-nanosecond reverse dark electron-transfer reaction, as known in the art of photo-induced reversible electron transfer reactions. This results in the rapid formation of the starting organic free radical compound, polydiacetylene, and photosensitizer compound, if a photosensitizer compound is present, as they existed prior to the absorption of photons for the photo-induced thermochromic forward reaction. In one embodiment, the photo-induced reaction is a photo-induced reversible electron transfer reaction.

In one embodiment of the optical shutter of the present invention, the photon absorption leading to the thermochromic change in absorption is induced by ultraviolet radiation. In one embodiment, the photon absorption is induced by visible radiation, and preferably is induced by near-infrared radiation. In one embodiment, the absorption of photons is from a free radical ground state to an excited state of the free radical compound. This is particularly important where the lower excited state corresponding directly to the free radical moiety ground state of the free radical compound can not be efficiently populated by absorption into another absorption band of the free radical compound, such as for example, into a $\pi \rightarrow \pi^*$ aromatic absorption band due to relatively inefficient internal conversion from this excited state to the lower excited state related to the free radical moiety. For example, absorption of laser radiation at 532 nm by IR-165 dye in a layer does not produce the efficient photo-induced heat transfer that occurs upon absorption of laser radiation at 1065 nm. Suitable light sources for providing the photons for the optical shutters of this invention are not limited to lasers and may include a wide variety of other light sources known in the art for providing high intensity (such as greater than 1 mW) sources of photons such as, for example, a continuous or pulsed xenon lamp source with an external modulator and bandpass filters to provide the desired wavelengths of irradiation for the desired time intervals and durations of exposure to the photons.

In one embodiment of the optical shutter of this invention, the optical shutter comprises a metallized layer on at least one side of a layer comprising the photon-absorbing compound and the reversible thermochromic polydiacetylene compound of the optical shutter. In one embodiment, the metallized layer comprises aluminum. Other suitable metals include, but are not limited to, gold and silver. This metallized layer may serve a variety of functions, such as, for example, reflecting more incident radiation back through the optical shutter layer, enhancing heat development in the optical shutter layer, and acting as an enhanced or a reduced reflective element in an optical switch comprising the optical shutter of this invention. For example, these enhanced or reduced reflective properties may result from the effect of the changes of absorption in the layer comprising the photon-absorbing compound and polydiacetylene compound on the reflectivity of the metallized layer and may be utilized in a reversible transparent-to-reflective optical shutter or optical gate in a fiber optics communication channel as described, for example, in U.S. patent application Ser. No. 09/706,166, filed Nov. 3, 2000, titled "Optical Shutter", by Carlson of the common assignee, the disclosures of which are fully incorporated herein by reference.

One aspect of the present invention pertains to an optical shutter comprising an organic radical cation compound and a polydiacetylene compound. In one embodiment, the polydiacetylene compound is characterized by a change in absorption in a visible and/or a near-infrared wavelength region as a result of a photo-induced heat transfer from the radical cation compound. In one embodiment, the optical shutter further comprises a radical anion.

Another aspect of this invention pertains to an optical shutter comprising an organic radical anion compound and a polydiacetylene compound. In one embodiment, the polydiacetylene compound is characterized by a change in absorption in a visible and/or a near-infrared region as a result of a photo-induced heat transfer from the radical anion compound. In one embodiment, the optical shutter further comprises a radical cation.

Another aspect of the present invention pertains to an optical shutter comprising an organic free radical compound, preferably a radical cation compound or a radical anion compound, and a reversible thermochromic polydiacetylene compound in which the polydiacetylene compound is characterized by having a change in absorption in a visible and/or near-infrared region as a result of a photo-induced heat transfer from the free radical compound. In one embodiment, the optical shutter is utilized in an optical switch for a fiber optics communications channel. For example, an initial optical density of less than 0.1 or greater than 80% transmission in the 1525 to 1575 nm region of interest for the optical switch may be switched upon laser exposure and rapid conversion of photons to heat to an optical density of greater than 1.6 or less than 2.5% transmission in less than 1 nanosecond and then reversibly switched back upon cooling to the initial optical density in less than 1 second. The optical shutters of the present invention may be utilized as a reversible transparent-to-opaque optical shutter or optical gate in a fiber optics communication channel, including in an optical switch and in an optical modulator, as described, for example, in U.S. patent application Ser. Nos. 09/705,118 and 09/706,166, filed Nov. 2, 2000, and Nov. 3, 2000, respectively, both titled "Optical Shutter", to Carlson of the common assignee, the disclosures of which are fully incorporated herein by reference.

In one embodiment, the optical shutter is utilized in a viewing lens of an eyewear device, such as, for example, in sunglasses. In one embodiment, the optical shutter is utilized in a laser protection device for protection of eyes or sensors from a source of laser radiation. In one embodiment, the optical shutter is utilized in a security protection system based on detecting the change in absorption upon exposure of the optical shutter in the security protection system to high intensity radiation selected from the group consisting of ultraviolet radiation, visible radiation, and infrared radiation. The high intensity radiation may be produced by a pulsed laser which provides a unique light intensity to trigger the optical shutter, which is not activated under ambient room light and other conventional conditions. In addition to the above product applications, the optical shutter of this invention may be utilized in a variety of other reversible imaging applications including, for example, reversible optical information recording.

The organic nature of the organic free radical compounds, the polydiacetylenes, and the optical shutters of the present invention is advantageous for ease of fabrication, such as by known methods of coating or plastic molding, in comparison to inorganic glass materials typically used in all-optical or hybrid optical shutters and switches.

While the invention has been described in detail and with reference to specific and general embodiments thereof, it will be apparent to one skilled in the art that various changes and modifications can be made therein without departing from the spirit and scope thereof.

What is claimed is:

1. An optical shutter comprising:
   (a) a photon-absorbing organic free radical compound; and
   (b) a polydiacetylene compound;
   wherein said polydiacetylene compound is characterized by having a change in absorption in a wavelength region as a result of a photo-induced heat transfer from said free radical compound.

2. The optical shutter of claim 1, wherein said free radical compound is a radical cation.

3. The optical shutter of claim 2, wherein said radical cation is an aminimum radical cation.

4. The optical shutter of claim 2, wherein said radical cation is tris(p-butylaminophenyl)aminium hexafluoroantimonate.

5. The optical shutter of claim 1, wherein said free radical compound is a radical anion.

6. The optical shutter of claim 5, wherein said radical anion is an anthrasemiquinone radical anion.

7. The optical shutter of claim 1, wherein said free radical compound is a radical cation, and wherein said optical shutter further comprises a radical anion.

8. The optical shutter of claim 1, wherein said free radical compound is a radical anion, and wherein said optical shutter further comprises a radical cation.

9. The optical shutter of claim 1, wherein said polydiacetylene compound comprises a metal salt.

10. The optical shutter of claim 1, wherein said change in absorption is greater than 0.1.

11. The optical shutter of claim 1, wherein said change in absorption is greater than 1.5.

12. The optical shutter of claim 1, wherein said change in absorption is greater than 3.0.

13. The optical shutter of claim 1, wherein said wavelength region is from 400 to 700 nm.

14. The optical shutter of claim 1, wherein said wavelength region is from 700 to 1000 nm.

15. The optical shutter of claim 1, wherein said wavelength region is from 1000 to 1700 nm.

16. The optical shutter of claim 1, wherein said wavelength region is from 1250 to 1600 nm.

17. The optical shutter of claim 1, wherein said wavelength region is from 1520 to 1580 nm.

18. The optical shutter of claim 1, wherein said photo-induced heat transfer occurs in less than 1 nanosecond after absorption of photons by said free radical compound.

19. The optical shutter of claim 1, wherein said photo-induced heat transfer occurs in less than 0.1 nanoseconds after absorption of photons by said free radical compound.

20. The optical shutter of claim 1, wherein said photo-induced heat transfer occurs in less than 0.01 nanoseconds after absorption of photons by said free radical compound.

21. The optical shutter of claim 1, wherein said photo-induced heat transfer occurs in less than 0.001 nanoseconds after absorption of photons by said free radical compound.

22. The optical shutter of claim 1, wherein said change in absorption is reversed by cooling to a temperature of less than 50° C.

23. The optical shutter of claim 1, wherein said change in absorption is reversed by cooling to a temperature of less than 75° C.

24. The optical shutter of claim 1, wherein said change in absorption is reversed by cooling to a temperature of less than 110° C.

25. The optical shutter of claim 1, wherein said change in absorption is reversed in less than 1 second after said photo-induced heat transfer.

26. The optical shutter of claim 1, wherein said change in absorption is reversed in less than 10 milliseconds after said photo-induced heat transfer.

27. The optical shutter of claim 1, wherein said change in absorption is reversed in less than 1 millisecond after said photo-induced heat transfer.

28. The optical shutter of claim 1, wherein said change in absorption is reversed in less than 0.1 milliseconds after said photo-induced heat transfer.

29. The optical shutter of claim 1, wherein said change in absorption is reversed by a photo-induced-reaction.

30. The optical shutter of claim 29, wherein said optical shutter comprises a photosensitizer compound and said photo-induced reaction is sensitized by said photosensitizer compound.

31. The optical shutter of claim 29, wherein said photo-induced reaction is a photo-induced reversible electron transfer reaction.

32. The optical shutter of claim 1, wherein said photo-induced heat transfer is induced by ultraviolet radiation.

33. The optical shutter of claim 1, wherein said photo-induced heat transfer is induced by visible radiation.

34. The optical shutter of claim 1, wherein said photo-induced heat transfer is induced by near-infrared radiation.

35. The optical shutter of claim 1, wherein said photo-induced heat transfer is induced by absorption of photons from a free radical ground state to an excited state of said free radical compound.

36. The optical shutter of claim 1, wherein said optical shutter further comprises a metallized layer on at least one side of a layer comprising said free radical compound and said polydiacetylene compound of said optical shutter.

37. The optical shutter of claim 36, wherein said metallized layer comprises aluminum.

38. An optical shutter comprising
   (a) a photon-absorbing organic free radical compound; and
   (b) a polydiacetylene compound;
   wherein said polydiacetylene compound is characterized by having a change in absorption in a wavelength region as a result of a photo-induced heat transfer from said free radical compound; and wherein said optical shutter is utilized in an optical switch for a fiber optics communications channel.

39. An optical shutter comprising:
   (a) a photon-absorbing organic free radical compound; and
   (b) a polydiacetylene compound;
   wherein said polydiacetylene compound is characterized by having a change in absorption in a wavelength region from 400 nm to 2000 nm as a result of a photo-induced heat transfer from said free radical compound; and wherein said optical shutter is utilized in a laser protection device for protection of eyes or sensors from a source of laser radiation.

40. An optical shutter comprising:
   (a) a photon-absorbing organic free radical compound; and
   (b) a polydiacetylene compound;
   wherein said polydiacetylene compound is characterized by having a change in absorption in a wavelength region from 400 nm to 2000 nm as a result of a photo-induced heat transfer from said free radical compound; and wherein said optical shutter is utilized in a security protection system based on detecting said change in absorption upon exposure of said optical shutter in said security protection system to high intensity radiation selected from the group consisting of ultraviolet radiation, visible radiation, and infrared radiation.

41. An optical shutter comprising:

(a) a photon-absorbing organic free radical compound; and (b) a polydiacetylene compound;

wherein said polydiacetylene compound is characterized by having a change in absorption in a visible wavelength region as a result of a photo-induced heat transfer from said free radical compound; and wherein said optical shutter is utilized in a viewing lens of an eyewear device.

42. An optical shutter comprising:

(a) a photon-absorbing material, wherein said photon-absorbing material converts absorbed photons to heat in less than 1 nanosecond; and (b) a reversible thermochromic polydiacetylene compound;

wherein said polydiacetylene compound of said optical shutter changes its absorption at one or more wavelengths when heated to a temperature greater than 50° C. and reversibly changes said absorption when subsequently cooled to a temperature less than 50° C.

* * * * *